US010305611B1

(12) United States Patent
Rimini et al.

(10) Patent No.: US 10,305,611 B1
(45) Date of Patent: May 28, 2019

(54) PROXIMITY DETECTION USING A HYBRID TRANSCEIVER (71) Applicant: Qualcomm Incorporated, San Diego, CA (US)

(72) Inventors: Roberto Rimini, San Diego, CA (US); Udara Fernando, San Diego, CA (US); Shahin Mehdizad Taleie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/939,038

(22) Filed: Mar. 28, 2018

(51) Int. Cl.
| | |
|---|---|
| *H04B 17/27* | (2015.01) |
| *H04B 5/00* | (2006.01) |
| *H04W 8/00* | (2009.01) |
| *H04W 4/02* | (2018.01) |
| *H04W 4/80* | (2018.01) |

(52) U.S. Cl.
CPC .......... *H04B 17/27* (2015.01); *H04B 5/0043* (2013.01); *H04W 4/025* (2013.01); *H04W 4/80* (2018.02); *H04W 8/005* (2013.01)

(58) Field of Classification Search
CPC ...... G01C 3/08; H04B 10/0795; H04B 10/40; H04B 10/548; H04B 10/616; H04B 10/70; H04B 17/27; H04B 5/0043; H04W 4/043; H04W 4/025; H04W 8/005; H04W 52/00; H04W 52/04; H04W 52/08; H01Q 1/247; H01Q 1/3233
See application file for complete search history.

(56) References Cited

U.S. PATENT DOCUMENTS

| | | |
|---|---|---|
| 4,510,595 A | 4/1985 | Glance et al. |
| 5,231,632 A | 7/1993 | Yamao et al. |
| 5,337,005 A | 8/1994 | Fenk et al. |

(Continued)

FOREIGN PATENT DOCUMENTS

WO  2008058770  5/2008

OTHER PUBLICATIONS

Partial International Search Report—PCT/US2018/024960—ISA/EPO—dated Jul. 3, 2018.

(Continued)

*Primary Examiner* — Daniel Lai
(74) *Attorney, Agent, or Firm* — Colby Nipper/Qualcomm (57) ABSTRACT

An apparatus is disclosed for proximity detection using a hybrid-transceiver. In an example aspect, the apparatus includes a hybrid transceiver coupled to a first antenna and a second antenna. The hybrid transceiver is configured to generate, in a digital domain, a digital baseband radar signal. The hybrid transceiver is also configured to transmit, via the first antenna, a radio-frequency transmit signal that is derived from the digital baseband radar signal. Via the second antenna, the hybrid transceiver is configured to receive a radio-frequency receive signal, which includes a portion of the radio-frequency transmit signal that is reflected by an object. In an analog domain, the hybrid transceiver is configured to generate an analog receive signal that includes a beat frequency, which is indicative of a frequency offset between the radio-frequency transmit signal and the radio-frequency receive signal. The analog receive signal is derived from the radio-frequency receive signal.

25 Claims, 8 Drawing Sheets

(56) References Cited

U.S. PATENT DOCUMENTS

| | | | |
|---|---|---|---|
| 5,521,600 | A | 5/1996 | McEwan |
| 5,640,694 | A * | 6/1997 | Milton, Jr. ............. G01S 7/021 |
| | | | 342/57 |
| 6,487,219 | B1 * | 11/2002 | Snider ..................... H04J 3/12 |
| | | | 370/478 |
| 8,446,888 | B2 | 5/2013 | Kim |
| 8,781,420 | B2 | 7/2014 | Schulb et al. |
| 8,781,422 | B2 | 7/2014 | Tanii et al. |
| 9,176,223 | B2 | 11/2015 | Derham et al. |
| 9,179,299 | B2 | 11/2015 | Schlub et al. |
| 9,474,042 | B1 | 10/2016 | Wootton et al. |
| 9,547,070 | B2 | 1/2017 | Corcos et al. |
| 2002/0003488 | A1 | 1/2002 | Levin et al. |
| 2002/0128052 | A1 | 9/2002 | Neagley et al. |
| 2004/0214598 | A1 * | 10/2004 | Parameswaran Rajamma ............ |
| | | | G01S 13/04 |
| | | | 455/556.1 |
| 2005/0242984 | A1 * | 11/2005 | Waters .................. G01S 7/022 |
| | | | 342/52 |
| 2006/0071790 | A1 | 4/2006 | Duron et al. |
| 2006/0199587 | A1 * | 9/2006 | Hansen ................. H04B 15/02 |
| | | | 455/442 |
| 2006/0234635 | A1 | 10/2006 | Riordan et al. |
| 2008/0297487 | A1 | 12/2008 | Hotelling et al. |
| 2011/0140949 | A1 | 6/2011 | Lee |
| 2011/0250928 | A1 | 10/2011 | Schlub et al. |
| 2013/0172045 | A1 | 7/2013 | Caballero et al. |
| 2014/0064264 | A1 | 3/2014 | Morita et al. |
| 2015/0201385 | A1 | 7/2015 | Mercer et al. |
| 2015/0226837 | A1 * | 8/2015 | Corcos ................... G01S 13/34 |
| | | | 342/106 |
| 2015/0285906 | A1 | 10/2015 | Hooper et al. |
| 2015/0381269 | A1 | 12/2015 | Deyle |
| 2016/0077196 | A1 * | 3/2016 | Dehlink ............. G01R 31/2822 |
| | | | 342/169 |
| 2016/0178730 | A1 | 6/2016 | Trotta et al. |
| 2016/0282457 | A1 | 9/2016 | Mazzaro et al. |
| 2016/0327634 | A1 * | 11/2016 | Katz ..................... G01S 7/4008 |
| 2018/0287651 | A1 | 10/2018 | Fernando et al. |

OTHER PUBLICATIONS

Ellinger, et al., "Local Positioning for Wireless Sensor Networks", 2007 IEEE Globecom Workshops; Year: 2007; pp. 1-6, 2007, 6 pages.

Yan, et al., "An mmWave Wireless Communication and Radar Detection Integrated Network for Railways", 2016 IEEE 83rd Vehicular Technology Conference (VTC Spring); Year: 2016; pp. 1-5, 2016, 5 pages.

"International Search Report and Written Opinion", PCT Application No. PCT/US2018/024960, dated Aug. 27, 2018, 22 pages.

"Non-Final Office Action", U.S. Appl. No. 15/938,813, dated Oct. 24, 2018, 21 pages.

* cited by examiner

PROXIMITY DETECTION USING A HYBRID TRANSCEIVER

TECHNICAL FIELD

This disclosure relates generally to wireless transceivers and, more specifically, to a hybrid transceiver capable of performing certain operations in a digital domain and other operations in an analog domain.

BACKGROUND

Cellular and other wireless networks may utilize high frequencies and small wavelengths to provide high data rates. In particular, fifth generation (5G)-capable devices communicate using frequencies at or near the extremely-high frequency (EHF) spectrum with wavelengths at or near millimeter wavelengths. Although higher-frequency signals provide larger bandwidths to efficiently communicate large amounts of data, these signals suffer from higher path loss (e.g., path attenuation). To compensate for the higher path loss, transmit power levels can be increased or beamforming can concentrate energy in a particular direction.

Accordingly, the Federal Communications Commission (FCC) has determined a maximum permitted exposure (MPE) limit. To meet targeted guidelines, devices are responsible for balancing performance with transmission power and other constraints. This balancing act can be challenging to achieve, especially with devices that have cost, size, and other considerations.

SUMMARY

An apparatus is disclosed that implements proximity detection using a hybrid transceiver. The hybrid transceiver generates a radar signal in a digital domain and performs a beating operation of a reflected radar signal with a transmitted radar signal in an analog domain. This digital-analog hybrid architecture enables specified linearity and phase noise performance to be achieved for a targeted frequency range. By beating the signals in the analog domain, the reflected radar signal and the transmitted radar signal are naturally synchronized and quantization errors associated with performing the beating operation in the digital domain can be avoided. With the use of selection circuitry, some components within the hybrid transceiver can be utilized for both proximity detection and wireless communication. Responsive to proximity detection, transmission parameters can be adjusted for wireless communication to enable the hybrid transceiver to meet guidelines promulgated by the government or the wireless industry.

In an example aspect, an apparatus is disclosed. The apparatus includes a first antenna, a second antenna, and a hybrid transceiver. The hybrid transceiver is coupled to the first antenna and the second antenna. The hybrid transceiver is configured to generate, in a digital domain, a digital baseband radar signal. The hybrid transceiver is also configured to transmit, via the first antenna, a radio-frequency transmit signal derived from the digital baseband radar signal. Via the second antenna, the hybrid transceiver is configured to receive a radio-frequency receive signal. The radio-frequency receive signal including a portion of the radio-frequency transmit signal that is reflected by an object. In an analog domain, the hybrid transceiver is configured to generate an analog receive signal that includes a beat frequency. The analog receive signal is derived from the radio-frequency receive signal. The beat frequency is indicative of a frequency offset between the radio-frequency transmit signal and the radio-frequency receive signal.

In an example aspect, an apparatus is disclosed. The apparatus includes digital radar means for generating a digital baseband radar signal. The apparatus also includes transmission means for transmitting a radio-frequency transmit signal via a first antenna. The radio-frequency transmit signal is derived from the digital baseband radar signal. The apparatus additionally includes reception means for receiving a radio-frequency receive signal via a second antenna. The radio-frequency receive signal including a portion of the radio-frequency transmit signal that is reflected by an object. The apparatus further includes downconversion means for generating an analog receive signal that includes a beat frequency. The analog receive signal is derived from the radio-frequency receive signal. The beat frequency is indicative of a frequency offset between the radio-frequency transmit signal and the radio-frequency receive signal.

In an example aspect, a method for operating a hybrid transceiver for proximity detection is disclosed. The method includes generating a digital baseband radar signal and transmitting a radio-frequency transmit signal via a first antenna. The radio-frequency transmit signal is derived from the digital baseband radar signal. The method also includes receiving a radio-frequency receive signal via a second antenna. The radio-frequency receive signal including a portion of the radio-frequency transmit signal that is reflected by an object. The method additionally includes generating an analog receive signal that includes a beat frequency. The analog receive signal is derived from the radio-frequency receive signal. The beat frequency is indicative of a frequency offset between the radio-frequency transmit signal and the radio-frequency receive signal.

In an example aspect, an apparatus is disclosed. The apparatus includes a local oscillator, an upconversion mixer, a downconversion mixer, and a multiplexer. The multiplexer includes a first input node coupled to the upconversion mixer, a second input node coupled to the local oscillator, and an output node coupled to the downconversion mixer.

DETAILED DESCRIPTION

An electronic device may use a high transmit power to compensate for path loss associated with millimeter wave (mmW) signals. Many of these electronic devices can be physically operated by a user. Such physical proximity presents opportunities for radiation to exceed a given guideline, such as a maximum permitted exposure (MPE) limit as determined by the Federal Communications Commission (FCC). Because of these issues, it is advantageous to enable devices to detect a proximity of the user.

Some proximity-detection techniques may use a dedicated sensor to detect the user, such as a camera or infrared sensor. However, these sensors may be bulky and expensive. Furthermore, a single electronic device can include multiple antennas that are positioned on different surfaces (e.g., top, bottom, or opposite sides). To account for each of these antennas, multiple cameras or sensors may need to be installed near each of these antennas, which further increases a cost and size of the electronic device.

Other proximity-detection techniques utilize a radar sensor, which may include a voltage-controlled oscillator (VCO). The voltage-controlled oscillator can generate an analog signal with a frequency that varies according to an input voltage. By sweeping the frequency, the voltage-controlled oscillator can produce a linear-frequency modulated chirp waveform, which can be used for proximity detection. However, performance of the voltage-controlled oscillator may be constrained by available power and to frequencies for which the voltage-controlled oscillator behaves linearly. In particular, it becomes increasingly challenging to design a voltage-controlled oscillator that can achieve a targeted linearity performance across a wide range of frequencies. To achieve a finer range resolution (e.g., on the order of centimeters) for close-range radar-based applications, larger bandwidths (e.g., on the order of gigahertz) can be utilized. The finer range resolution improves range accuracy and an ability to distinguish between multiple objects separated in range. However, some voltage-controlled oscillators may be unable to support the specified bandwidths or it may be infeasible to implement such voltage-controlled oscillators to realize a targeted range resolution. Furthermore, the voltage-controlled oscillator can also contribute to phase noise in a radar signal. The phase noise represents random fluctuations in phase, which can raise an overall noise floor. High-levels of phase noise can decrease a sensitivity or a dynamic range of an electronic device. This makes it more challenging to detect weaker signals or signals that originate at farther distances.

In contrast, techniques for proximity detection that are described herein utilize a hybrid transceiver. The hybrid transceiver generates a radar signal in a digital domain, which enables specified linearity and phase noise performance to be achieved across a targeted frequency range. Although the radar signal is generated in the digital domain, the hybrid transceiver performs, in an analog domain, a beating operation of a reflected radar signal with a transmitted radar signal. In general, the beating operation is a heterodyne operation that mixes two signals of relatively similar frequencies to produce another signal at a lower frequency. The lower frequency of the other signal corresponds to a frequency difference between the two signals. By beating the signals in the analog domain, the reflected radar signal and the transmitted radar signal are naturally synchronized. Further, quantization errors associated with performing the beating operation in the digital domain can be avoided.

In some implementations, the hybrid transceiver may be utilized to implement a monostatic radar sensor for stand-alone radar-based applications. For example, the hybrid transceiver can be implemented as an automotive bumper sensor to assist with parking or autonomous driving. As another example, the hybrid transceiver can be installed on a drone to provide collision avoidance.

In other implementations, the hybrid transceiver can selectively perform proximity detection or wireless communication. With the use of selection circuitry, some components within the hybrid transceiver can be utilized for both proximity detection and wireless communication. This can decrease cost and size of the hybrid transceiver. Based on the proximity detection, transmission parameters can be adjusted for wireless communication to enable the hybrid transceiver to meet guidelines promulgated by the government and wireless industry, such as a Maximum Permitted Exposure (MPE) limit as determined by the Federal Communications Commission (FCC). For explanation purposes, the examples provided in FIGS. 3-7 assume the electronic device can support both proximity detection and wireless communication. However, it is to be understood that some of the components are optional for devices that do not utilize the hybrid transceiver to support wireless communication.

Figure 1:
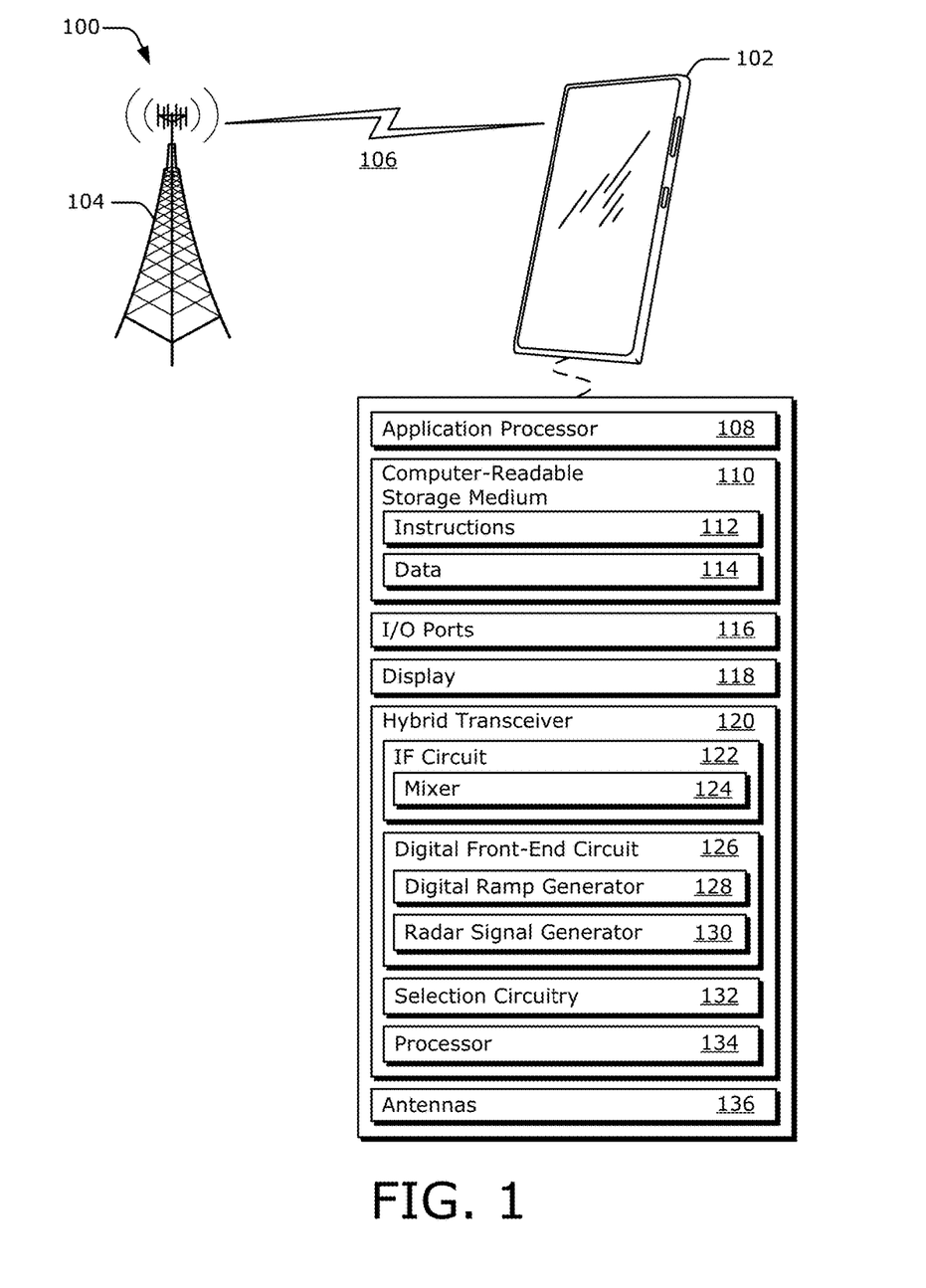
FIG. 1 illustrates an example computing device for proximity detection using a hybrid transceiver.

FIG. 1 illustrates an example computing device 102 for proximity detection using a hybrid transceiver. In an example environment 100, the computing device 102 communicates with a base station 104 through a wireless communication link 106 (wireless link 106). In this example, the computing device 102 is implemented as a smart phone. However, the computing device 102 may be implemented as any suitable computing or electronic device, such as a modem, cellular base station, broadband router, access point, cellular phone, gaming device, navigation device, media device, laptop computer, desktop computer, tablet computer, server, network-attached storage (NAS) device, smart appliance or other internet of things (IoT) device, medical device, vehicle-based communication system, radar apparatus—including those for ground or flying vehicles, radio apparatus, and so forth.

The base station 104 communicates with the computing device 102 via the wireless link 106, which may be implemented as any suitable type of wireless link. Although depicted as a tower of a cellular network, the base station 104 may represent or be implemented as another device, such as a satellite, cable television head-end, terrestrial television broadcast tower, access point, peer-to-peer device, mesh network node, small cell node, fiber optic line, and so forth. Therefore, the computing device 102 may communicate with the base station 104 or another device via a wired connection, a wireless connection, or a combination thereof.

The wireless link 106 can include a downlink of data or control information communicated from the base station 104 to the computing device 102 and an uplink of other data or control information communicated from the computing device 102 to the base station 104. The wireless link 106 may be implemented using any suitable communication protocol or standard, such as 3rd Generation Partnership Project Long-Term Evolution (3GPP LTE), $5^{th}$ Generation (5G), IEEE 802.11, IEEE 802.16, Bluetooth™, and so forth. In some implementations, instead of or in addition to providing a data link, the wireless link 106 may wirelessly provide power and the base station 104 may comprise a power source.

The computing device 102 includes an application processor 108 and a computer-readable storage medium 110 (CRM 110). The application processor 108 may include any type of processor, such as a single-core processor or a multi-core processor, that executes processor-executable code stored by the CRM 110. The CRM 110 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the computing device 102, and thus does not include transitory propagating signals or carrier waves.

The computing device 102 may also include input/output ports 116 (I/O ports 116) and a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, and so forth. The display 118 presents graphics of the computing device 102, such as a user interface associated with an operating system, program, or application. Alternately or additionally, the display 118 may be implemented as a display port or virtual interface, through which graphical content of the computing device 102 is presented.

A hybrid transceiver 120 of the computing device 102 provides connectivity to respective networks and other electronic devices connected therewith. Additionally, the computing device 102 may include a wired transceiver, such as an Ethernet or fiber optic interface for communicating over a local network, intranet, or the Internet. The hybrid transceiver 120 may facilitate communication over any suitable type of wireless network, such as a wireless LAN (WLAN), peer-to-peer (P2P) network, mesh network, cellular network, wireless wide-area-network (WWAN), and/or wireless personal-area-network (WPAN). In the context of the example environment 100, the hybrid transceiver 120 enables the computing device 102 to communicate with the base station 104 and networks connected therewith.

The hybrid transceiver 120 includes circuitry and logic for transmitting and receiving signals via antennas 136. Components of the hybrid transceiver 120 can include amplifiers, mixers, switches, analog-to-digital converters, filters, and so forth for conditioning signals. The hybrid transceiver 120 may also include logic to perform in-phase/quadrature (I/Q) operations, such as synthesis, encoding, modulation, decoding, demodulation, and so forth. In some cases, components of the hybrid transceiver 120 are implemented as separate receiver and transmitter entities. Additionally or alternatively, the hybrid transceiver 120 can be realized using multiple or different sections to implement respective receiving and transmitting operations (e.g., separate transmit and receiver chains).

As shown, the hybrid transceiver 120 includes at least one intermediate-frequency (IF) circuit 122 (IF circuit 122) and at least one digital front-end (DFE) circuit 126. Although not explicitly shown, the hybrid transceiver 120 also includes a radio-frequency circuit that is coupled between the intermediate-frequency circuit 122 and the antennas 136. The intermediate-frequency circuit 122 and the digital front-end circuit 126 may be implemented together on a same integrated circuit chip or on separate integrated circuit chips. The intermediate-frequency circuit 122 includes at least one mixer 124, which performs frequency conversion between a baseband frequency and an intermediate frequency. The intermediate-frequency circuit 122 is further described with respect to FIG. 5.

The digital front-end circuit 126 is coupled to the intermediate-frequency circuit 122. The digital front-end circuit 126 and the intermediate-frequency circuit 122 pass analog baseband signals between each other. The digital front-end circuit 126 includes baseband circuitry to perform high-rate sampling processes that can include analog-to-digital conversion, digital-to-analog conversion, gain correction, skew correction, frequency translation, and so forth. The digital front-end circuit 126 also includes at least one digital ramp generator 128 and at least one radar signal generator 130, which are further described with respect to FIG. 4.

If the hybrid transceiver 120 supports both proximity detection and wireless communication, the hybrid transceiver 120 can also include selection circuitry 132. The selection circuitry 132 can include two or more switches, multiplexers, and so forth. The selection circuitry 132 is distributed between the intermediate-frequency circuit 122 and the digital front-end circuit 126, which is described in further detail with respect to FIGS. 3-5.

The hybrid transceiver 120 also includes a processor 134, which is coupled to the digital front-end circuit 126. The processor 134, which can be implemented as a modem, processes data and/or baseband signals associated with communicating data of the computing device 102 for wireless communication or detecting objects near the computing device 102 for proximity detection. The processor 134 is also coupled to the selection circuitry 132, which enables the processor 134 to cause the hybrid transceiver 120 to switch between performing wireless communication or proximity detection. The processor 134 may provide a digital communication interface for data, voice, messaging, proximity detection, or other applications of the computing device 102. The digital ramp generator 128, the radar signal generator 130, and the mixer 124 can at least partially implement proximity detection, as described with reference to FIGS. 4 and 5. In some implementations, the hybrid transceiver 120 and the processor 134 may be implemented together as a system-on-chip (SoC).

Although not explicitly depicted, the hybrid transceiver 120 or the processor 134 can also include a controller. The controller can include at least one processor and at least one CRM, such as the application processor 108 and the CRM 110. The CRM can store computer-executable instructions, such as the instructions 112. The processor and the CRM can be localized at one module or one integrated circuit chip or can be distributed across multiple modules or chips. Together, a processor and associated instructions can be realized in separate circuitry, fixed logic circuitry, hard-coded logic, and so forth. The controller can be implemented as part of the hybrid transceiver 120, the processor 134, a special-purpose processor configured to perform MPE techniques, a general-purpose processor, some combination thereof, and so forth.

Figure 2:
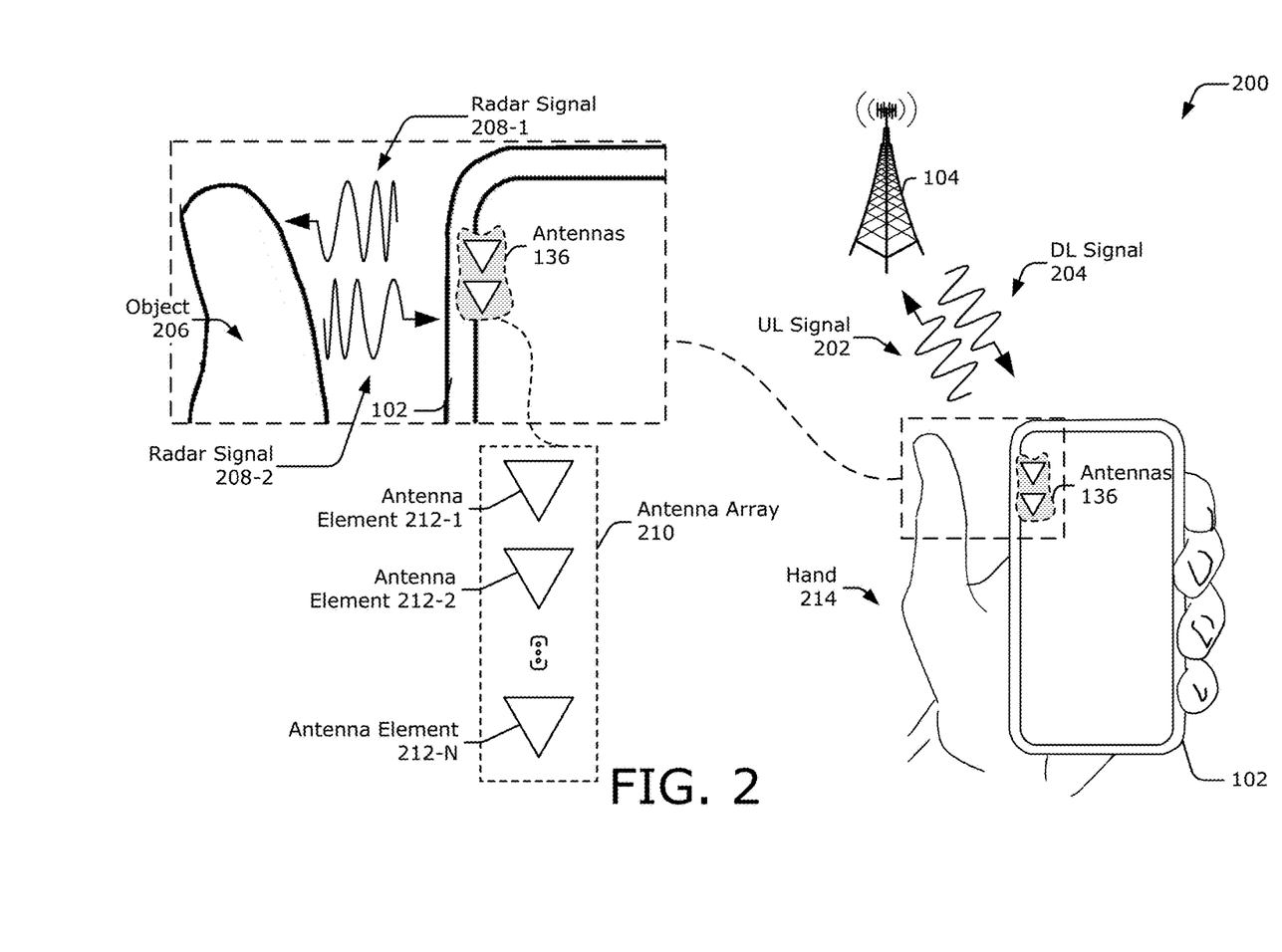
FIG. 2 illustrates an example operating environment for proximity detection using a hybrid transceiver.

FIG. 2 illustrates an example operating environment 200 for proximity detection using a hybrid transceiver. In the example environment 200, a hand 214 of a user holds the computing device 102. In one aspect, the computing device 102 communicates with the base station 104 by transmitting an uplink signal 202 (UL signal 202) or receiving a downlink signal 204 (DL signal 204) via the antennas 136. A user's thumb, however, may represent a proximate object 206 that may be exposed to radiation via the uplink signal 202.

To detect whether the object 206 exists or is within a detectable range, the computing device 102 transmits a radar signal 208-1 via at least one of the antennas 136 and receives a reflected radar signal 208-2 via at least another one of the antennas 136. The reflected radar signal 208-2 represents a portion of the radar signal 208-1 that is reflected by the object 206. The radar signal 208 can represent a frequency-modulated continuous-wave (FMCW) radar signal. Based on the radar signal 208, the range (e.g., distance or slant range) to the object 206 can be determined.

In some implementations, the antennas 136 may comprise at least two different antennas, at least two antenna elements 212 of an antenna array 210, at least two antenna elements 212 associated with different antenna arrays 210, or any combination thereof. As shown in FIG. 2, the antennas 136 correspond to the antenna elements 212 within the antenna array 210, which can include multiple antenna elements 212-1 to 212-N, where "N" represents a positive scalar value. Using at least one of the antenna elements 212, the hybrid transceiver 120 can transmit the radar signal 208-1 while receiving the radar signal 208-2 using at least another one of the antenna elements 212. In other words, the hybrid transceiver 120 can transmit a portion of the radar signal 208-1 via a first antenna element 212-1 during a same portion of time that it receives a portion of the reflected radar signal 208-2 via a second antenna element 212-2. The antennas 136 and/or elements thereof may be implemented using any type of antenna, including patch antennas, dipole antennas, and so forth.

If the computing device 102 includes multiple antennas 136 located on different sides of the computing device 102 (e.g., a top, a bottom, or opposite sides), the techniques for proximity detection using the hybrid transceiver 120 enable the user to be detected with respect to each antenna 136. In this way, transmission parameters can be independently adjusted relative to which antennas 136 are affected by the proximity of the object 206. Such independent detection therefore enables two or more of the antennas 136 to be configured for different purposes. For example, one of the antennas 136 can be configured for enhanced communication performance while another one of the antennas 136 is simultaneously configured to comply with FCC requirements. As described in further detail with respect to FIGS. 3-6, some of the components of the hybrid transceiver 120 can be utilized for both wireless communication and proximity detection.

Figure 3:
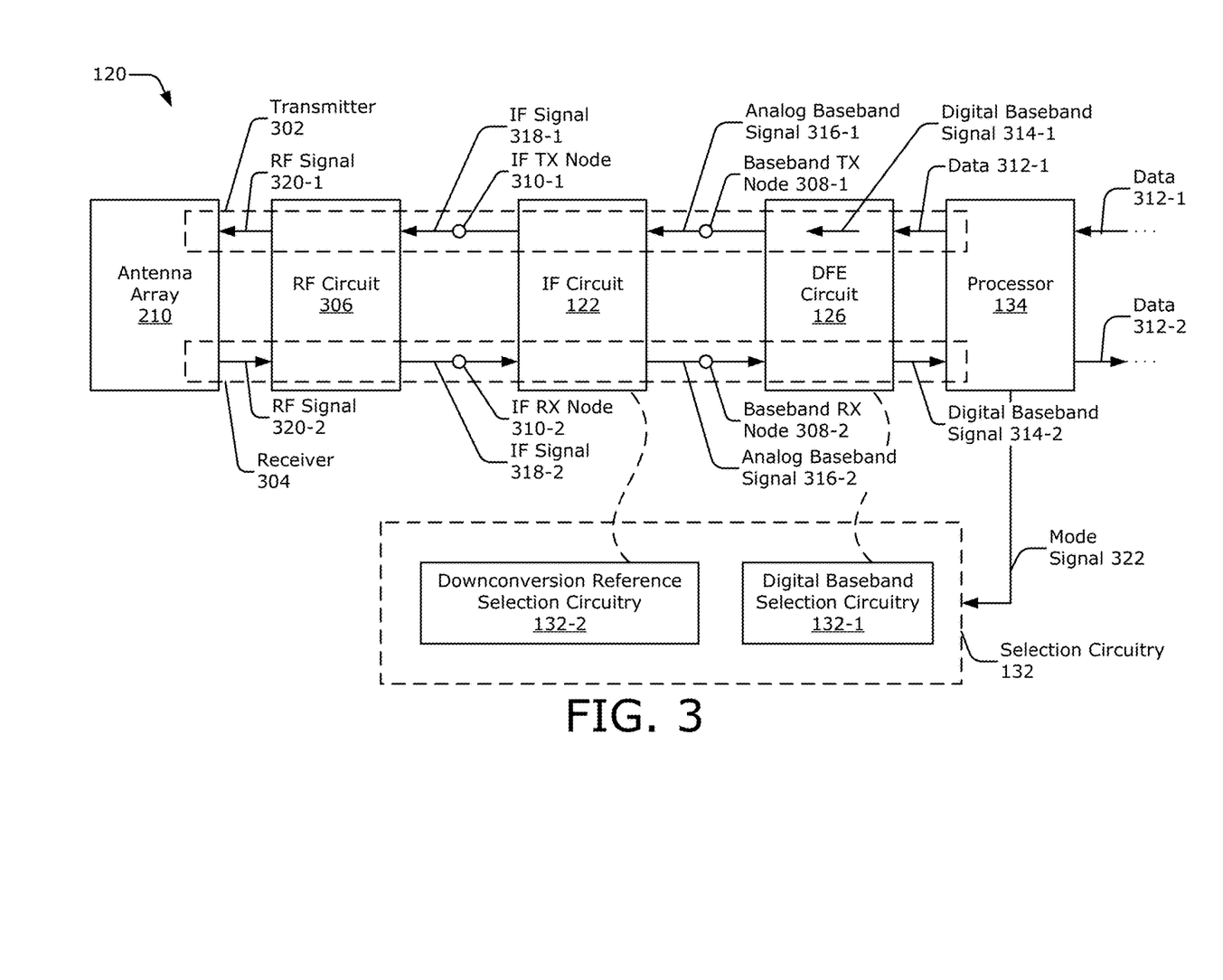
FIG. 3 illustrates an example implementation of a hybrid transceiver for proximity detection.

FIG. 3 illustrates an example implementation of the hybrid transceiver 120 for proximity detection. The hybrid transceiver 120 includes a transmitter 302 and a receiver 304, which are coupled between the processor 134 and the antenna array 210. The transmitter 302 and the receiver 304 are also distributed through portions of the digital front-end circuit 126, the intermediate-frequency circuit 122, and a radio-frequency (RF) circuit 306 (RF circuit 306). As shown in FIG. 3, the processor 134 is coupled to the digital front-end circuit 126 (DFE Circuit 126). The digital front-end circuit 126 is coupled to the intermediate-frequency circuit 122 via a baseband transmit node 308-1 (baseband TX node 308-1) and a baseband receive node 308-2 (baseband RX node 308-2). The intermediate-frequency circuit 122 is coupled to the radio-frequency circuit 306 via an intermediate-frequency transmit node 310-1 (IF TX node 310-1) and an intermediate-frequency receive node 310-2 (IF RX node 310-2). The radio-frequency circuit 306 is coupled to the antenna array 210.

In general, the intermediate-frequency circuit 122 is associated with upconverting baseband signals to an intermediate frequency or downconverting intermediate-frequency signals to baseband. The intermediate frequency can be on the order of several gigahertz (GHZ), such as between approximately 5 and 15 GHz. Likewise, the radio-frequency circuit 306 is associated with upconverting intermediate-frequency signals to a radio frequency or downconverting radio-frequency signals to intermediate frequencies. The radio frequency can include frequencies in the extremely-high frequency spectrum, such as frequencies between approximately 28 and 36 GHz.

The processor 134 obtains data 312-1 from the computing device 102. The data 312-1 can include communication data that is to be transmitted to another entity, such as the base station 104. In some situations, the data 312 may include a request from a radar-based function or application of the computing device 102 to perform proximity detection. The data 312 may be received from the application processor 108 in other implementations. For wireless communication, the processor 134 can provide the data 312-1 to the digital front-end circuit 126.

Along a transmit path, which is shown via the transmitter 302, the digital front-end circuit 126 generates a digital baseband signal 314-1. The digital baseband signal 314-1 can include the data 312-1 for wireless communication or a digital radar signal for proximity detection. Based on the digital baseband signal 314-1, the digital front-end circuit 126 generates an analog baseband signal 316-1 at the baseband transmit node 308-1. The intermediate-frequency circuit 122 upconverts the analog baseband signal 316-1 to produce an intermediate-frequency signal 318-1 (IF signal 318-1) at the intermediate-frequency transmit node 310-1.

The radio-frequency circuit 306 can include mixers and power amplifiers, which respectively upconvert and amplify the intermediate-frequency signal 318-1 to generate a radio-frequency signal 320-1 (RF signal 320-1). The radio-frequency signal 320-1 is transmitted via the antenna array 210. Depending on the situation, the radio-frequency signal 320-1 may represent the uplink signal 202 or the radar signal 208-1 of FIG. 2. As shown via the transmit path, the radio-frequency signal 320-1 is derived from the intermediate-frequency signal 318-1, which in turn is derived from the analog baseband signal 316-1 and the digital baseband signal 314-1.

Along the receive path, which is shown via the receiver 304, the radio-frequency circuit 306 receives another radio-frequency signal 320-2. The radio-frequency signal 320-2 may represent the downlink signal 204 or the radar signal 208-2, which is reflected by the object 206 (FIG. 2). The radio-frequency circuit 306 can include a low-noise amplifier (LNA) and other mixers to respectively amplify and downconvert the radio-frequency signal 320-2 to generate an intermediate-frequency signal 318-2 at the intermediate-frequency receive node 310-2. The intermediate-frequency circuit 122 downconverts the intermediate-frequency signal 318-2 to generate the analog baseband signal 316-2 at the baseband receive node 308-2. The digital front-end circuit 126 digitizes the analog baseband signal 316-2 to generate the digital baseband signal 314-2. As shown via the receive path, the digital baseband signal 314-2 is derived from the analog baseband signal 316-2, which in turn is derived from the intermediate-frequency signal 318-2 and the radio-frequency signal 320-2. As shown via the multiple upconversion and downconversion stages of the hybrid transceiver 120, the hybrid transceiver 120 implements a superheterodyne transceiver.

The processor 134 obtains the digital baseband signal 314-2 and can generate data 312-2 for the computing device 102. The data 312-2 can be provided to the processor 108 to communicate data to a user or provide a proximity alert. The processor 134 can also set an operating mode of the hybrid transceiver 120, such as a wireless communication mode or a proximity detection mode. Accordingly, the processor 134 can generate a mode signal 322, which causes the selection circuitry 132 to appropriately configure the hybrid transceiver 120 for wireless communication or for proximity detection. In other implementations, the application processor 108 can perform one or more of these functions.

The selection circuitry 132 can include digital baseband selection circuitry 132-1, which is implemented within the digital front-end circuit 126, and/or downconversion reference selection circuitry 132-2, which is implemented within the intermediate-frequency circuit 122. The digital baseband selection circuitry 132-1 and the downconversion reference selection circuitry 132-2 are further described with respect to FIGS. 4 and 5, respectively.

Figure 4:
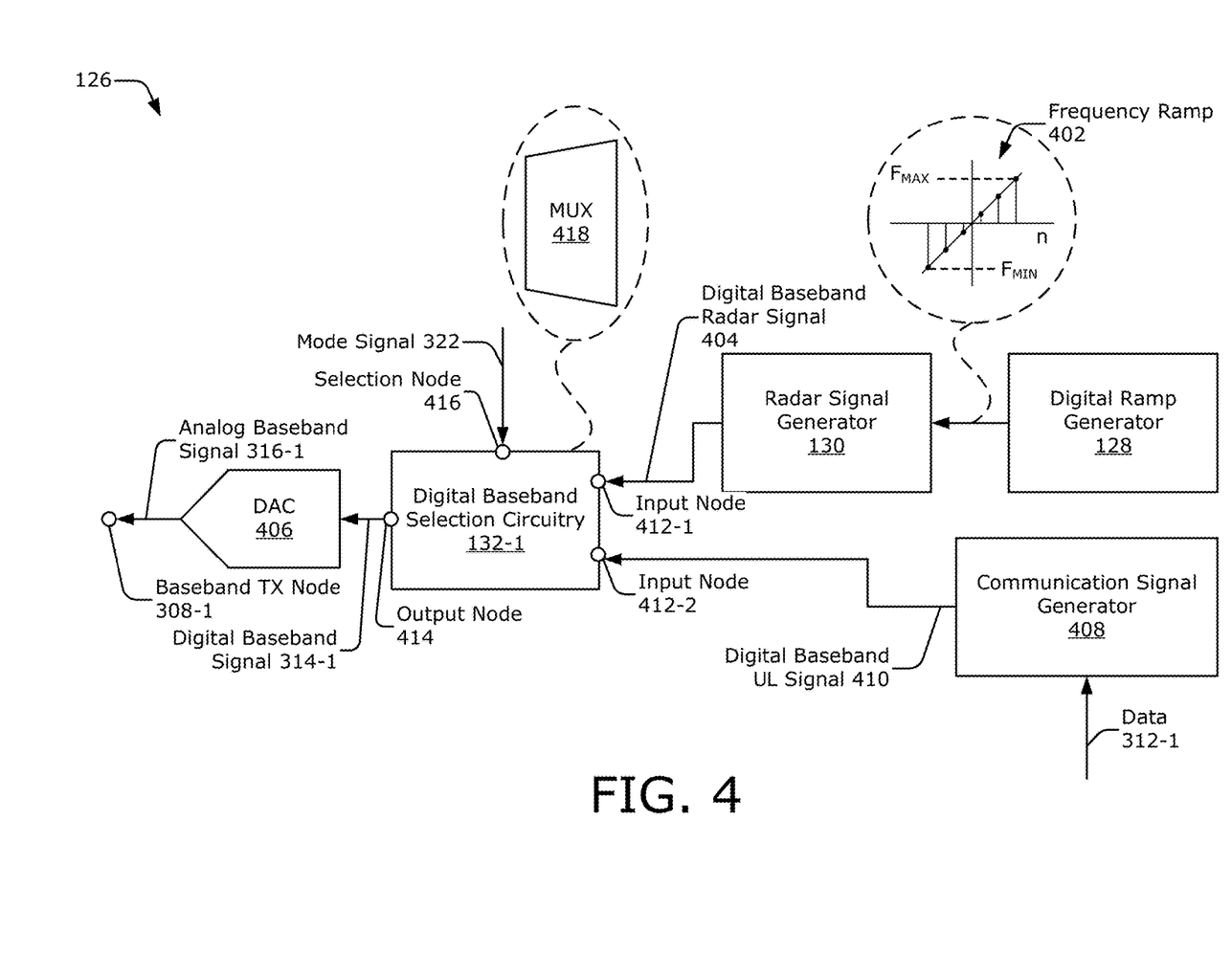
FIG. 4 illustrates an example portion of a digital front-end circuit for proximity detection using a hybrid transceiver.

FIG. 4 illustrates an example portion of the digital front-end circuit 126 for proximity detection using the hybrid transceiver 120. The components that are depicted in FIG. 4 correspond to the portion of the digital front-end circuit 126 that is implemented along the transmit chain (e.g., components that are incorporated within the transmitter 302 of FIG. 3). The digital front-end circuit 126 includes the digital ramp generator 128. The digital ramp generator 128 specifies a frequency associated with a discrete time interval. The discrete time is represented by a variable "n." The digital ramp generator 128 generates a frequency ramp 402, which specifies multiples frequencies across multiple discrete time intervals. The frequency ramp 402 defines a frequency modulation that is used to generate the radar signal 208. A slope of the frequency ramp 402 can increase or decrease across the discrete time intervals to represent a linear-frequency modulation (LFM) (e.g., chirp), a sawtooth-frequency modulation, a triangular-frequency modulation, and so forth. In FIG. 4, the frequency ramp 402 is shown to be a linear-frequency modulation, which includes frequencies ranging from a minimum frequency ($F_{MIN}$) to a maximum frequency ($F_{MAX}$). The minimum frequency and the maximum frequency specify a bandwidth of the radar signal 208. A difference between the maximum frequency and the minimum frequency can be on the order of gigahertz to support close-range radar applications (e.g., to support range resolutions and detection ranges on the order of centimeters). By generating the frequency ramp 402 in the digital domain, the digital ramp generator 128 may ensure that the frequency ramp 402 achieves a specified linearity and phase noise performance across the targeted range of frequencies (e.g., from the minimum frequency to the maximum frequency). In addition to supporting wide bandwidths, the digital ramp generator 128 can also support narrow bandwidths, which can be on the order of megahertz.

The radar signal generator 130 is coupled to the digital ramp generator 128 and obtains the frequency ramp 402. Based on the frequency ramp 402, the radar signal generator 130 generates a digital baseband radar signal 404. The radar signal generator 130 can include a look-up table, which stores digital samples corresponding to the frequencies indicated via the frequency ramp 402. The samples can comprise complex values, which include in-phase and quadrature (I/Q) components. An example sample at discrete time "n" is shown below in Equation 1.

$$\text{sample}(n) = e^{j2\pi K n^2} \qquad \text{Equation 1}$$

where "n" represents a discrete time and "K" represents a slope of the frequency ramp 402.

The radar signal generator 130 can also apply amplitude weights across the multiple samples of the digital baseband radar signal 404. This can enable the radar signal generator 130 to compensate for predetermined distortions that are associated with the transmitter 302. For example, a low-pass filter in the transmit chain may not be designed to support the bandwidth of the digital baseband radar signal 404 (e.g., the low-pass filter may have a narrower pass-band than the bandwidth of the digital baseband radar signal 404). As such, the low-pass filter may attenuate some frequencies more than others. If left unchecked, this can introduce distortion in the radar signal 208, which could lead to false detections and reduced accuracy. However, because these distortion characteristics can be predetermined beforehand and provided to the radar signal generator 130, the radar signal generator 130 can provide proactive compensation in digital baseband. As a result, the amplitude weighting can enable the radar signal 208 to have a relatively flat response over the target bandwidth such that a magnitude and phase of the radar signal 208 is linear despite the limitations of other components within the transmit chain, whether those components are digital or analog components. For example, the amplitude weighting may be configured to compensate for filter droop and/or other operational parameters of the filter or other component.

The digital front-end circuit 126 also includes a digital-to-analog converter (DAC) 406 (DAC 406), which is coupled to the radar signal generator 130. The digital-to-analog converter 406 obtains the digital baseband radar signal 404 as the digital baseband signal 314-1 and converts the digital baseband signal 314-1 to produce the analog baseband signal 316-1. The digital-to-analog converter 406 can be designed to support the bandwidth of the digital baseband radar signal 404. The analog baseband signal 316-1 is provided to the baseband transmit node 308-1.

The digital front-end circuit 126 can also optionally include a communication signal generator 408 and the digital baseband selection circuitry 132-1 to support wireless communication. The communication signal generator 408 can be coupled to the processor 134 and obtain the data 312-1 that is to be propagated via the transmitter 302. The communication signal generator 408 generates a digital baseband uplink signal 410 (digital baseband UL signal 410) to carry the data 312-1.

The digital baseband selection circuitry 132-1 includes a first input node 412-1 coupled to the radar signal generator 130, a second input node 412-2 coupled to the communication signal generator 408, and an output node 414 coupled to the digital-to-analog converter 406. The digital baseband selection circuitry 132-1 can also include a selection node 416, which is coupled to the processor 134. As an example, the digital baseband selection circuitry 132-1 can be implemented via a multiplexer 418 (MUX 418). Alternatively, the digital baseband selection circuitry 132-1 can be implemented via a switch that is controlled by the processor 134.

The digital baseband selection circuitry 132-1 connects the radar signal generator 130 or the communication signal generator 408 to the digital-to-analog converter 406. In this way, the digital baseband selection circuitry 132-1 selectively provides the digital baseband radar signal 404 or the digital baseband uplink signal 410 as the digital baseband signal 314-1. The selection can be based on the mode signal 322, which is obtained via the selection node 416. The mode signal 322 is indicative of the first input node 412-1, which is coupled to the radar signal generator 130, or the second input node 412-2, which is coupled to the communication signal generator 408. Accordingly, the digital front-end circuit 126 can switch between supporting proximity detection or wireless communication, respectively. For either operation mode, the analog baseband signal 316-1 is provided to the intermediate-frequency circuit 122, which is further described with respect to FIG. 5.

Figure 5:
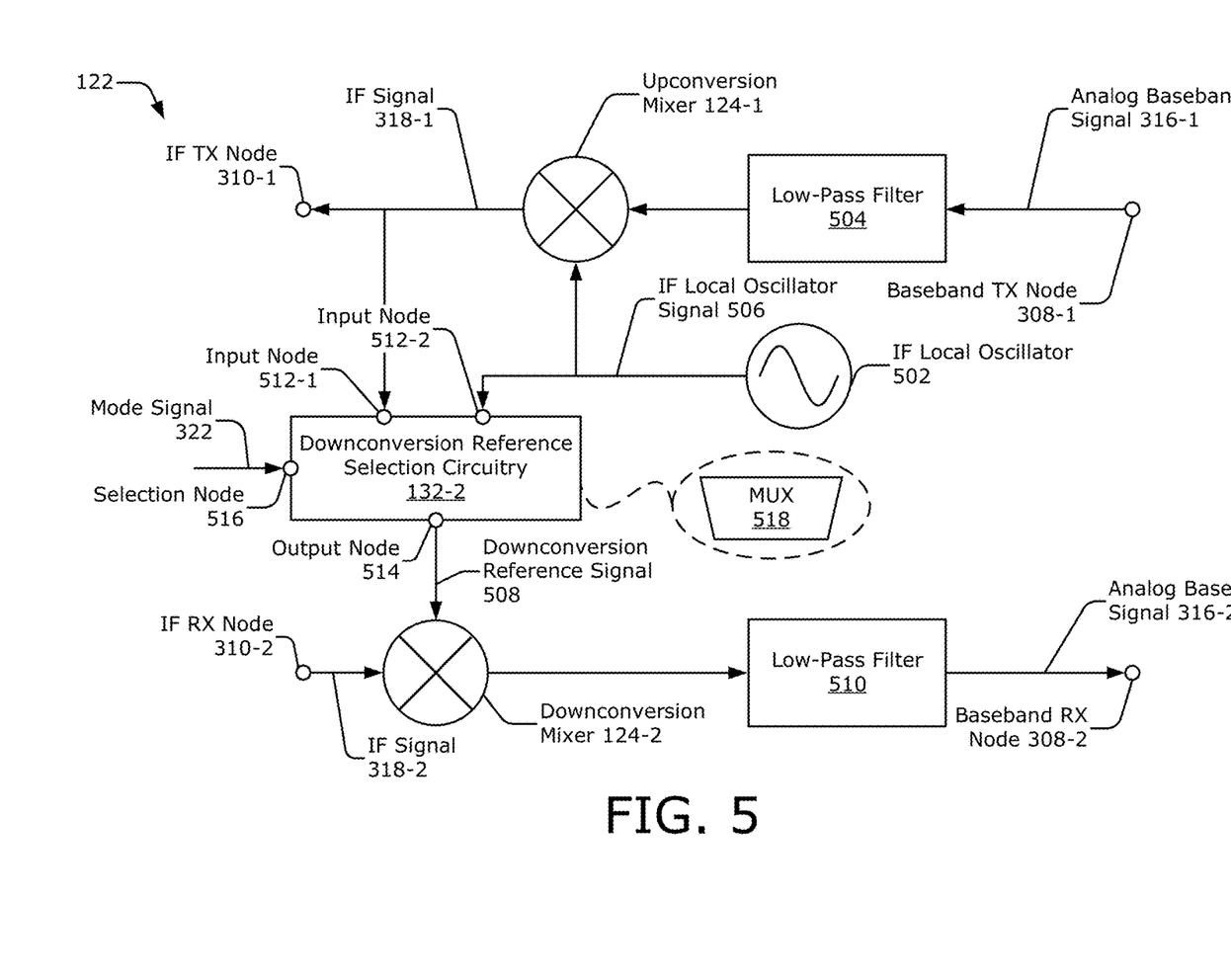
FIG. 5 illustrates an example intermediate-frequency circuit for proximity detection using a hybrid transceiver.

FIG. 5 illustrates an example intermediate-frequency circuit 122 for proximity detection using the hybrid transceiver 120. The components that are depicted in FIG. 5 are distributed between the transmit chain and the receive chain. In other words, components that are coupled between the baseband transmit node 308-1 and the intermediate-frequency transmit node 310-1 are incorporated within the transmitter 302, and components that are coupled between the intermediate-frequency receive node 310-2 and the baseband receive node 308-2 are incorporated within the receiver 304 (of FIG. 3). Some components, such as an intermediate-frequency local oscillator 502, can be utilized by both the transmitter 302 and the receiver 304 and can therefore be implemented within either or separate from both.

Along the transmit chain, the intermediate-frequency circuit 122 obtains the analog baseband signal 316-1 at the baseband transmit node 308-1. The intermediate-frequency circuit 122 can include a filter 504 (e.g., a low-pass filter (LPF)), which is coupled to the baseband transmit node 308-1. The low-pass filter 504 attenuates higher, undesired frequencies that may be present in the analog baseband signal 316-1.

An upconversion mixer 124-1 is coupled to the low-pass filter 504 and the intermediate-frequency local oscillator 502. The intermediate-frequency local oscillator 502 generates an intermediate-frequency local oscillator signal 506. The upconversion mixer 124-1 uses the intermediate-frequency local oscillator signal 506 to upconvert the analog baseband signal 316-1 to produce the intermediate-frequency signal 318-1. The intermediate-frequency signal 318-1 is provided to the intermediate-frequency transmit node 310-1.

Along the receive chain, the intermediate-frequency circuit 122 receives the intermediate-frequency signal 318-2 at the intermediate-frequency receive node 310-2. The intermediate-frequency circuit 122 includes a downconversion mixer 124-2, which is coupled to the intermediate-frequency receive node 310 and the intermediate-frequency transmit node 310-1. The downconversion mixer 124-2 downconverts the intermediate-frequency signal 318-2 using a downconversion reference signal 508 to produce the analog baseband signal 316-2.

In the case of proximity detection, the downconversion reference signal 508 comprises the intermediate-frequency signal 318-1, which is transmitted by the transmitter 302 via at least one of the antennas 136. By using the intermediate-frequency signal 318-1 as the downconversion reference signal 508, the downconversion mixer 124-2 performs a beating operation, which downconverts the received intermediate-frequency signal 318-2 to baseband and causes the analog baseband signal 316-2 to include a beat frequency. The beat frequency represents a frequency offset between the intermediate-frequency signal 318-1 and the received intermediate-frequency signal 318-2. This frequency offset is proportional to a round-trip delay associated with the radar signal 208, which can be used to determine a range to the object 206, as described below.

The intermediate-frequency circuit 122 can also include another filter 510 (e.g., a low-pass filter), which is coupled to the downconversion mixer 124-2 and filters the analog baseband signal 316-2. The intermediate-frequency circuit 122 provides the analog baseband signal 316-2 at the baseband receive node 308-2. Although not explicitly shown, the upconversion mixer 124-1 and the downconversion mixer 124-2 can be implemented using quadrature mixers 124, which individually upconvert or downconvert in-phase and quadrature components of the analog baseband signal 316-1 or the received intermediate-frequency signal 318-2, respectively. As such, there can be parallel in-phase and quadrature paths from the radar signal generator 130 of FIG. 4 to the intermediate-frequency transmit node 310-1, or from the intermediate-frequency receive node 310-2 to the processor 134.

There are several advantages to performing the beating operation in the analog domain. One such advantage is the transmitted and received radar signals 208 are inherently synchronized. Additionally, performing the beating operation in the analog domain avoids quantization errors that may occur if the beating operation is performed in the digital domain. Furthermore, because the analog baseband signal 316-2 includes the beat frequency, potential dynamic range problems are avoided during analog-to-digital conversion. A sampling rate used for the analog-to-digital conversion can also be reduced, which enables the hybrid transceiver 120 to conserve power.

The intermediate-frequency circuit 122 can also optionally include the downconversion reference selection circuitry 132-2 to support wireless communication. The downconversion reference selection circuitry 132-2 includes a first input node 512-1 coupled to the intermediate-frequency transmit node 310-1, a second input node 512-2 coupled to the intermediate-frequency local oscillator 502, and an output node 514 coupled to the downconversion mixer 124-2. The downconversion reference selection circuitry 132-2 can also include a selection node 516, which is coupled to the processor 134. As an example, the downconversion reference selection circuitry 132-2 can be implemented via a multiplexer 518 (MUX 518). Alternatively, the downconversion reference selection circuitry 132-2 can be implemented via a switch that is controlled by the processor 134.

The downconversion reference selection circuitry 132-2 connects the intermediate-frequency transmit node 310-1 or the intermediate-frequency local oscillator 502 to the downconversion mixer 124-2. In this way, the downconversion reference selection circuitry 132-2 selectively provides the intermediate-frequency signal 318-1 or the intermediate-frequency local oscillator signal 506 as the downconversion reference signal 508. The selection can be based on the mode signal 322, which is obtained via the selection node 516. The mode signal 322 is indicative of the first input node 512-1, which is coupled to the intermediate-frequency transmit node 310-1, or the second input node 512-2, which is coupled to the intermediate-frequency local oscillator 502. Accordingly, the intermediate-frequency circuit 122 can switch between supporting proximity detection or wireless communication.

For wireless communication, the intermediate-frequency signal 318-2 is derived from the downlink radio-frequency signal 204. The downconversion mixer 124-2 downconverts the intermediate-frequency signal 318-2 using the intermediate-frequency local oscillator signal 506 to produce the analog baseband signal 316-2. For either operation mode, the analog baseband signal 316-2 is provided to the digital front-end circuit 126, which is further described with respect to FIG. 6.

Figure 6:
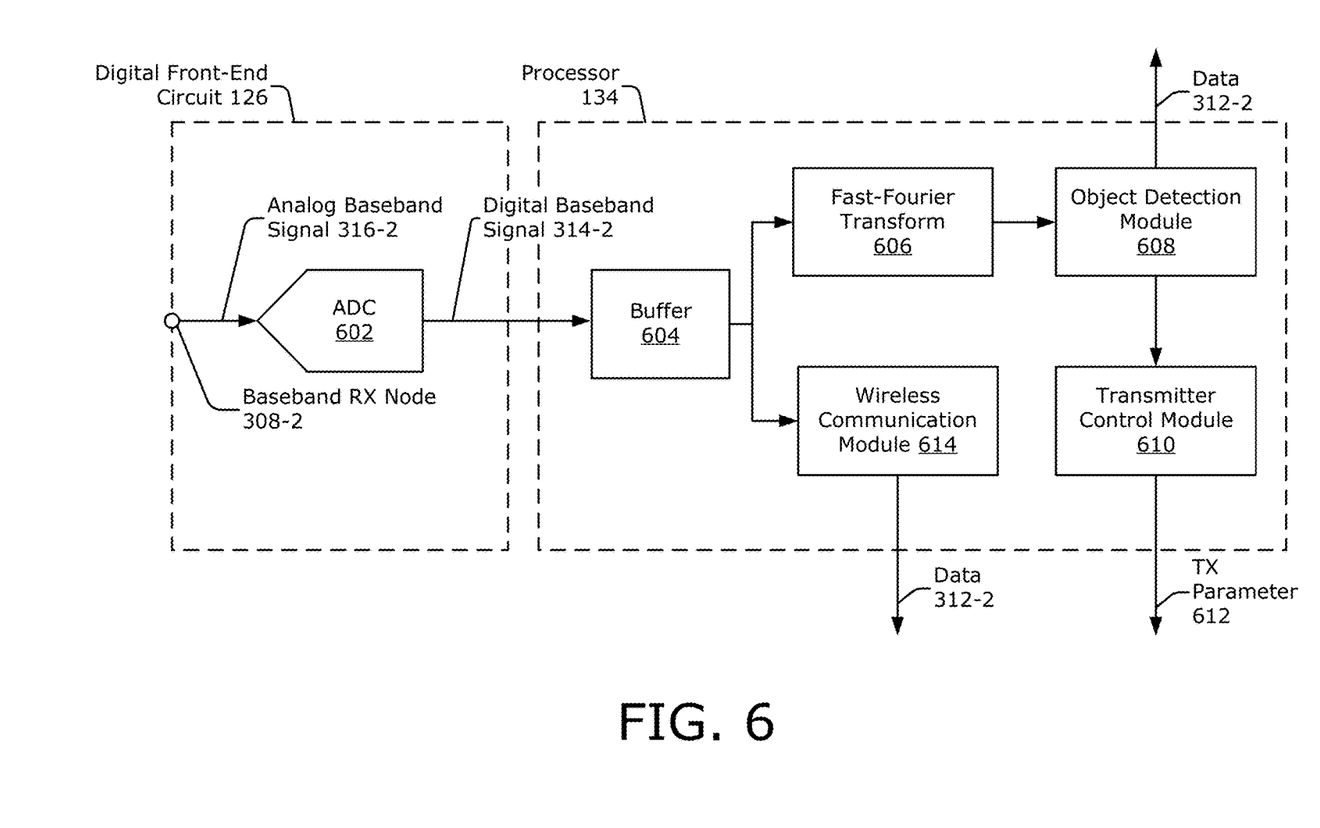
FIG. 6 illustrates an example portion of a digital front-end circuit and processor for proximity detection using a hybrid transceiver.

FIG. 6 illustrates an example portion of the digital front-end circuit 126 and the processor 134 for proximity detection using the hybrid transceiver 120. The components that are depicted in FIG. 6 correspond to portions of the digital front-end circuit 126 and the processor 134 that are implemented along or coupled to the receive path. The digital front-end circuit 126 obtains the analog baseband signal 316-2 via the baseband receive node 308-2. The digital front-end circuit 126 includes an analog-to-digital converter (ADC) 602 (ADC 602), which is coupled to the baseband receive node 308-2 and converts the analog baseband signal 316-2 to produce the digital baseband signal 314-2. If the analog baseband signal 316-2 is derived from the radar signal 208, the beat frequency includes a low frequency, which may be on the order of megahertz. Due to this low frequency, power can be conserved by reducing a clock rate of the analog-to-digital converter 602. Although not depicted, the digital front-end circuit 126 can also include other circuitry that filters or decimates the digital baseband signal 314-2.

The processor 134 can include a buffer 604, which obtains the digital baseband signal 314-2 and isolates the processor 134 from the digital front-end circuit 126. For proximity detection, the processor 134 can process the digital baseband signal 314-2 to detect the object 206 and determine a range to the object 206. For example, the processor 134 can perform a Fast-Fourier Transform (FFT) 606 operation, which converts the digital baseband signal 314-2 from a time domain signal to a frequency domain signal. The processor 134 can further include an object detection module 608, which can detect the object 206 based on an amplitude of the resulting output exceeding a predefined threshold. The object detection module 608 can further utilize radar-based frequency-modulation ranging techniques to determine the range to the object 206 based on the beat frequency and the slope of the frequency ramp 402. In some cases, the range to the object 206 (shown as the data 312-2) can be communicated by the processor 134 to the computing device 102. In some implementations, the components or functions of the processor 134 illustrated in FIG. 6 may be included in the application processor 108. In this case, the data 312-2 is provided to the application processor 108.

The processor 134 may also include a transmitter control module 610, which may adjust or specify a transmission parameter 612 (TX parameter 612) of the transmitter 302 or at least one of the antennas 136. For example, the transmission parameter 612 can specify an attribute of the uplink signal 202, such as power level, frequency, duration, beam shape, beam steering angle, which ones of the antennas 136 are used (e.g., for cases in which multiple antennas 136 are positioned on different sides of the computing device 102), and combinations thereof. The transmission parameter 612 can be based on the range to the object 206. For example, a higher transmit power may be used for objects 206 detected at farther ranges, or a lower transmit power may be used for objects 206 detected at closer ranges. In some cases, the transmitter control module 610 may determine the transmission parameter 612 to meet or comply with federal and/or communication guidelines. To support wireless communication, the processor 134 may also include a wireless communication module 614, which enables the processor 134 to pass along communication data (shown as the data 312-2) to the processor 108 of the computing device 102.

Figure 7:
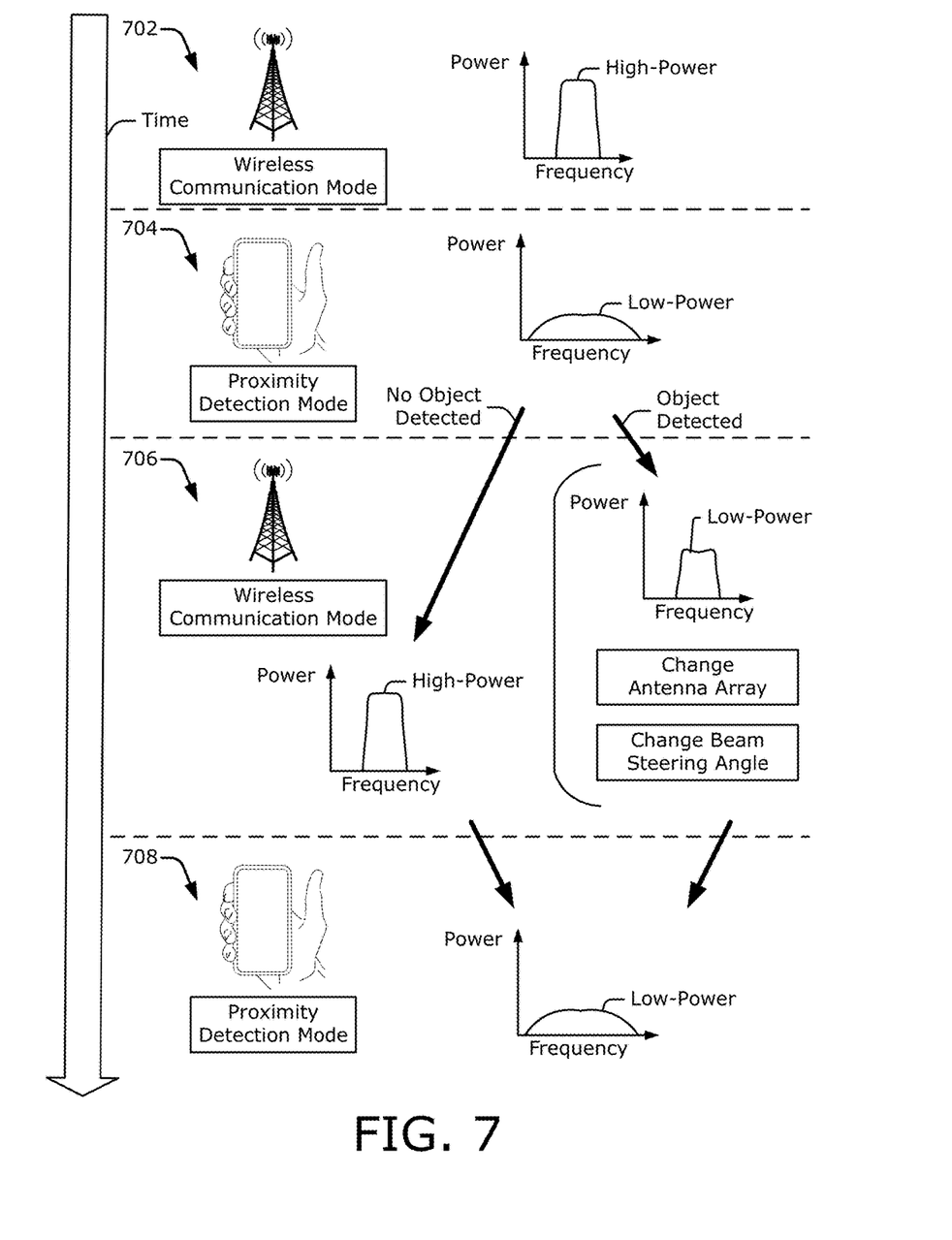
FIG. 7 illustrates an example sequence flow diagram for proximity detection using a hybrid transceiver.

FIG. 7 illustrates an example sequence flow diagram for proximity detection using a hybrid transceiver, with time elapsing in a downward direction. Examples of a wireless communication mode are shown at 702 and 706, and examples of a proximity detection mode are shown at 704 and 708. At 702, the hybrid transceiver 120 transmits a high-power (e.g., normal) uplink signal 202 configured to provide sufficient range. After transmitting the uplink signal 202, the radar signal 208-1 is transmitted via the hybrid transceiver 120 at 704. As described above, the radar signal 208 enables the computing device 102 to detect an object 206 and determine if the object 206 is near the antennas 136. Based on the detection, the transmitter control module 610 can generate a transmission parameter 612. In some implementations, the transmission parameter 612 can be generated for a next uplink signal 202 to account for MPE compliance guidelines. For example, if the object 206 is detected, the transmitter control module 610 can decrease the transmit power for the next uplink signal 202. Alternatively, if the object 206 is not detected, the transmitter control module 610 can keep the transmit power unchanged. In other implementations, the transmission parameter 612 can be for another radar signal 208, by specifying another one of the antennas 136 or a different transmit power level of a next radar signal 208.

The proximity detection mode can also determine the range to the object 206, thereby enabling the transmission parameter 612 to comply with range-dependent guidelines. An example range-dependent guideline includes a maximum power density. Power density is proportional to transmit power and inversely proportional to range. Accordingly, for a same transmit power level, an object 206 at a closer range is exposed to a higher power density than another object 206 at a farther range. Therefore, a similar power density at the object 206 can be achieved by increasing the transmit power level if the object 206 is at a farther range and decreasing the transmit power level if the object 206 is at a closer range. In this way, the transmission parameter 612 can be adjusted to enable the power density at the object 206 for both the closer range and the farther range to be below the maximum power density. At the same time, because the range is known, the transmit power level can be increased to a level that facilitates wireless communications and comports with the compliance guideline.

At 706, the hybrid transceiver 120 transmits the next uplink signal 202 using the transmission parameter 612 generated by the transmitter control module 610. In the depicted example, a high-power uplink signal 202 is transmitted if an object 206 is not detected. Alternatively, a low-power uplink signal 202 is transmitted if the object 206 is detected. The low-power can be, for example, between approximately five and twenty decibel-milliwatts (dBm) smaller than the high-power signal at 702. In addition to or instead of changing a power of the next uplink signal 202, the transmission parameter 612 can specify a different antenna 136 or a different beam steering angle for transmitting the next uplink signal 202 (e.g., different than the antenna 136 or the beam steering angle used for transmitting the high-power signal at 702).

At 708, the hybrid transceiver 120 transmits another radar signal 208 to attempt to detect the object 206. By scheduling multiple radar signals 208 over some time period, the hybrid transceiver 120 can dynamically adjust the transmission parameter 612 based on a changing environment. In some cases, the radar signal 208 can be transmitted and received between active data cycles that occur during wireless communication or during predetermined times set by the processor 134. By actively monitoring the environment, the hybrid transceiver 120 can appropriately adjust the transmission parameter 612 in real-time to balance communication performance with compliance or radiation requirements. The monitoring also enables the transmission parameter 612 to be incrementally adjusted to account for movement by the object 206. The sequence described above can also be applied to other antennas within the computing device 102. In some cases, the other antennas and the antennas 136 may transmit radar signals 208 at a same time or at different times.

Figure 8:
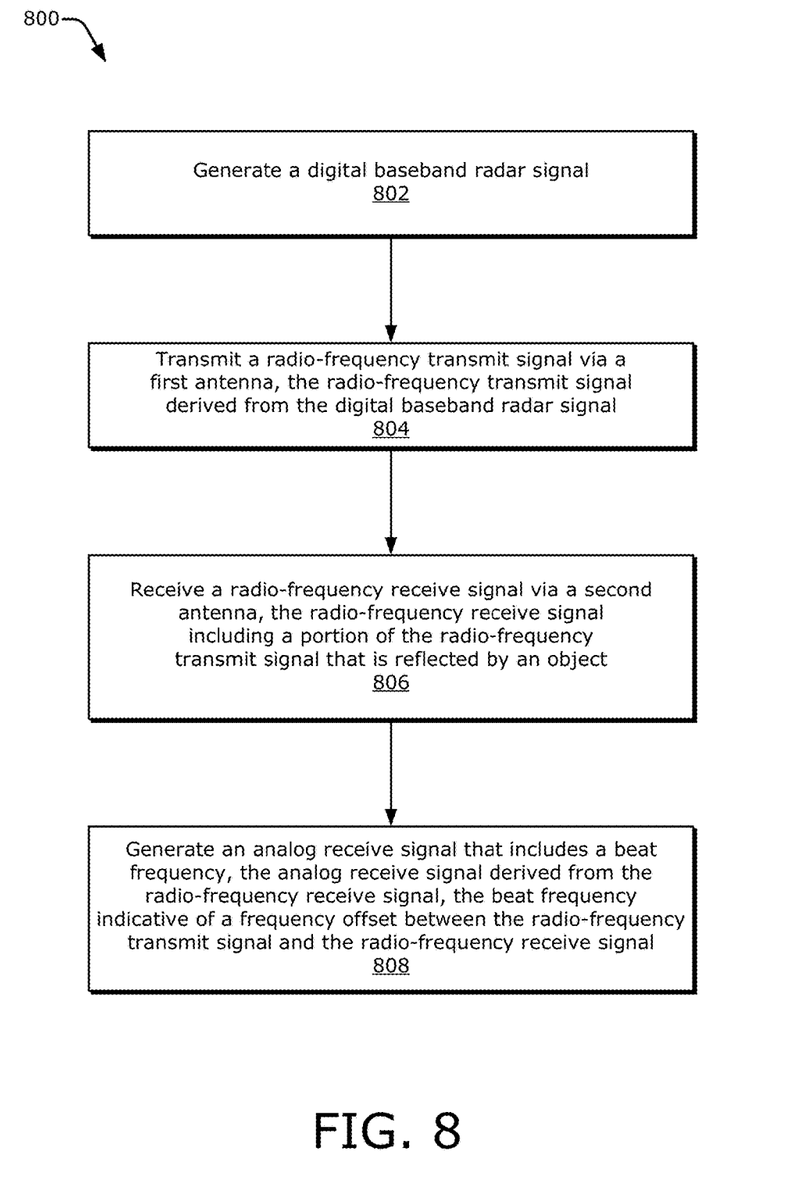
FIG. 8 is a flow diagram illustrating an example process for proximity detection using a hybrid transceiver.

FIG. 8 is a flow diagram illustrating an example process 800 for proximity detection using a hybrid transceiver. The process 800 is described in the form of a set of blocks 802-808 that specify operations that can be performed. However, operations are not necessarily limited to the order shown in FIG. 8 or described herein, for the operations may be implemented in alternative orders or in fully or partially overlapping manners. Operations represented by the illustrated blocks of the process 800 may be performed by a hybrid transceiver (e.g., of FIG. 1 or 3). More specifically, the operations of the process 800 may be performed by the digital front-end circuit 126 and the intermediate-frequency circuit 122, as shown in FIGS. 4 and 5.

At block 802, a digital baseband radar signal is generated. For example, the radar signal generator 130 can generate the digital baseband radar signal 404. The digital baseband radar signal 404 can be generated based on the frequency ramp 402, which specifies multiple frequencies across multiple discrete time intervals. The frequency ramp 402 can include a linear-frequency ramp to generate a chirp waveform for frequency-modulated continuous-wave radar techniques. The frequency ramp 402 also specifies a bandwidth of the radar signal 208, which can be on the order of gigahertz to support close-range and high-range resolution applications. As an example, the bandwidth can be at least one gigahertz, at least two gigahertz, at least five gigahertz, and so forth. The digital baseband radar signal 404 can include a complex signal, which includes in-phase and quadrature components.

At block 804, a radio-frequency transmit signal is transmitted via a first antenna. The radio-frequency transmit signal is derived from the digital baseband radar signal. For example, the hybrid transceiver 120 can transmit the radio-frequency signal 320-1, as shown in FIG. 3. The radio-frequency signal 320-1 can be radiated using at least one of the antennas 136. To generate the radio-frequency signal 320-1, the digital baseband signal 314-1 can be converted to the analog baseband signal 316-1 via the digital-to-analog converter 406 of FIG. 4 and upconverted using the intermediate-frequency circuit 122 and the radio-frequency circuit 306 of FIG. 3.

At block 806, a radio-frequency receive signal is received via a second antenna. The radio-frequency receive signal including a portion of the radio-frequency transmit signal that is reflected by an object. For example, the radar signal 208-2 (e.g., the radio-frequency signal 320-2) can be received via at least another one of the antennas 136 and the radio-frequency circuit 306. The radar signal 208-2 can be reflected by the object 206. In some cases, the object 206 may represent a user's thumb, appendage, or face.

At block 808, an analog receive signal that includes a beat frequency is generated. The analog receive signal is derived from the radio-frequency receive signal. The beat frequency is indicative of a frequency offset between the radio-frequency transmit signal and the radio-frequency receive signal. For example, the downconversion mixer 124-2 can generate the analog baseband signal 316-2 using the intermediate-frequency signal 318-1. The analog baseband signal 316-2 is derived from the radio-frequency signal 320-2 by downconverting the radio-frequency signal 320-2 via the radio-frequency circuit 306 and the intermediate-frequency circuit 122. By using the intermediate-frequency signal 318-1, the downconversion mixer 124-2 performs a beating operation, which causes the analog baseband signal 316-2 to include a beat frequency. The beat frequency is indicative of the frequency offset (e.g., frequency difference) between the radio-frequency signal 320-1 and the radio-frequency signal 320-2 and is proportional to a range to the object 206.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
   a first antenna and a second antenna; and
   a hybrid transceiver coupled to the first antenna and the second antenna, the hybrid transceiver configured to:
   generate, in a digital domain, a digital baseband radar signal;
   transmit, via the first antenna, a radio-frequency transmit signal derived from the digital baseband radar signal;
   receive, via the second antenna, a radio-frequency receive signal, the radio-frequency receive signal including a portion of the radio-frequency transmit signal that is reflected by an object; and
   generate, in an analog domain, an analog receive signal that includes a beat frequency, the analog receive signal derived from the radio-frequency receive signal, the beat frequency indicative of a frequency offset between the radio-frequency transmit signal and the radio-frequency receive signal.

2. The apparatus of claim 1, wherein the hybrid transceiver is configured to adjust a transmission parameter based on the beat frequency, the transmission parameter varying according to a range to the object.

3. The apparatus of claim 2, wherein the transmission parameter comprises at least one of the following:
   a power level;
   a beam steering angle;
   a frequency;
   a selected antenna; or
   a communication protocol.

4. The apparatus of claim 3, wherein the hybrid transceiver is configured to transmit an uplink signal using the transmission parameter.

5. The apparatus of claim 4, wherein:
   the uplink signal comprises a Fifth Generation (5G) uplink signal; and
   the radio-frequency transmit signal comprises a frequency-modulated continuous wave radar signal.

6. The apparatus of claim 4, wherein the hybrid transceiver includes:
   a radar signal generator configured to generate the digital baseband radar signal;
   a communication signal generator configured to generate a digital baseband uplink signal, the uplink signal derived from the digital baseband uplink signal; and
   digital baseband selection circuitry having a first input node coupled to the radar signal generator and a second input node coupled to the communication signal generator, the digital baseband selection circuitry configured to select the radar signal generator or the communication signal generator.

7. The apparatus of claim 6, wherein the digital baseband selection circuitry comprises a multiplexer or a switch.

8. The apparatus of claim 6, wherein:
   the hybrid transceiver includes a digital-to-analog converter configured to generate an analog baseband signal based on a digital baseband signal; and the digital baseband selection circuitry has an output coupled to the digital to-analog converter, the digital baseband selection circuitry configured to provide the digital baseband radar signal or the digital baseband uplink signal to the digital to analog converter as the digital baseband signal.

9. The apparatus of claim 8, wherein the hybrid transceiver includes:
an intermediate-frequency transmit node coupled to the first antenna;
an intermediate-frequency local oscillator configured to generate an intermediate-frequency local oscillator signal; and
a first mixer coupled to the intermediate-frequency local oscillator and coupled between the intermediate-frequency transmit node and the digital-to-analog converter, the first mixer configured to upconvert the analog baseband signal using the intermediate-frequency local oscillator signal to produce an intermediate-frequency signal at the intermediate-frequency transmit node, the analog baseband signal derived from the digital baseband radar signal or the digital baseband uplink signal.

10. The apparatus of claim 9, wherein the hybrid transceiver includes:
downconversion reference selection circuitry including a first input node coupled to the intermediate-frequency transmit node and a second input node coupled to the intermediate-frequency local oscillator, the downconversion reference selection circuitry configured to select the intermediate-frequency transmit node or the intermediate-frequency local oscillator.

11. The apparatus of claim 10, wherein:
the hybrid transceiver is configured to receive a downlink signal;
the downconversion reference selection circuitry is configured to provide the intermediate-frequency signal or the intermediate-frequency local oscillator signal; and
the hybrid transceiver includes:
a second mixer coupled to the second antenna and the downconversion reference selection circuitry, the second mixer configured to generate the analog receive signal using the intermediate-frequency signal or generate another analog receive signal that is derived from the downlink signal using the intermediate-frequency local oscillator signal.

12. The apparatus of claim 1, further comprising an antenna array including a first antenna element and a second antenna element, wherein:
the first antenna comprises the first antenna element;
the second antenna comprises the second antenna element; and
the hybrid transceiver is configured to receive the radio-frequency receive signal via the second antenna element during a portion of time that the radio-frequency transmit signal is transmitted via the first antenna element.

13. The apparatus of claim 1, wherein a bandwidth of the digital baseband radar signal is between approximately one gigahertz and approximately five gigahertz.

14. An apparatus comprising:
digital radar means for generating a digital baseband radar signal;
transmission means for transmitting a radio-frequency transmit signal via a first antenna, the radio-frequency transmit signal derived from the digital baseband radar signal;
reception means for receiving a radio-frequency receive signal via a second antenna, the radio-frequency receive signal including a portion of the radio-frequency transmit signal that is reflected by an object; and
downconversion means for generating an analog receive signal that includes a beat frequency, the analog receive signal derived from the radio-frequency receive signal, the beat frequency indicative of a frequency offset between the radio-frequency transmit signal and the radio-frequency receive signal.

15. The apparatus of claim 14, further comprising:
adjustment means for adjusting a transmission parameter based on the beat frequency, wherein the transmission parameter varies according to a range to the object; and
uplink means for transmitting an uplink signal using the transmission parameter.

16. The apparatus of claim 15, further comprising:
digital generation means for generating a digital baseband uplink signal, the uplink signal derived from the digital baseband uplink signal; and
digital baseband selection means for providing the digital baseband radar signal or the digital baseband uplink signal to the transmission means or the uplink means, respectively.

17. The apparatus of claim 16, further comprising:
oscillator means for generating an intermediate-frequency local oscillator signal;
upconversion means for generating an intermediate-frequency signal, the radio-frequency transmit signal derived from the intermediate-frequency signal, the intermediate-frequency signal derived from the digital baseband radar signal; and
downconversion reference selection means for providing the intermediate frequency signal or the intermediate-frequency local oscillator signal to the downconversion means.

18. The apparatus of claim 17, further comprising downlink means for receiving a downlink signal,
wherein the downconversion means is configured to generate another analog signal using the intermediate-frequency local oscillator signal provided via the downconversion reference selection means, the other analog signal derived from the downlink signal.

19. A method for operating a hybrid transceiver for proximity detection, the method comprising:
generating a digital baseband radar signal;
transmitting a radio-frequency transmit signal via a first antenna, the radio frequency transmit signal derived from the digital baseband radar signal;
receiving a radio-frequency receive signal via a second antenna, the radio-frequency receive signal including a portion of the radio-frequency transmit signal that is reflected by an object; and
generating an analog receive signal that includes a beat frequency, the analog receive signal derived from the radio-frequency receive signal, the beat frequency indicative of a frequency offset between the radio-frequency transmit signal and the radio-frequency receive signal.

20. The method of claim 19, further comprising:
adjusting a transmission parameter based on the beat frequency, wherein the transmission parameter varies according to a range to the object; and transmitting an uplink signal using the transmission parameter.

21. The method of claim 20, further comprising:
generating a digital baseband uplink signal;
selecting the digital baseband radar signal or the digital baseband uplink signal; and
upconverting a selected analog baseband signal derived from the digital baseband radar signal or the digital baseband uplink signal based on the selecting.

22. The method of claim 21, wherein:
the selecting of the digital baseband radar signal enables proximity detection; and
the selecting of the digital baseband uplink signal enables data propagation for wireless communication.

23. The method of claim 21, wherein the selecting of the digital baseband radar signal occurs before the selecting of the digital baseband uplink signal.

24. The method of claim 19, further comprising:
receiving a radio-frequency downlink signal;
generating an intermediate-frequency local oscillator signal; and
downconverting an intermediate-frequency downlink signal using the intermediate frequency local oscillator signal, the intermediate-frequency downlink signal derived from the radio-frequency downlink signal.

25. The method of claim 24, further comprising upconverting an analog baseband signal using the intermediate-frequency local oscillator signal to produce an intermediate-frequency radar signal, the analog baseband signal derived from the digital baseband radar signal,
wherein generating the analog receive signal comprises downconverting another intermediate-frequency radar signal using the intermediate-frequency radar signal, the other intermediate-frequency radar signal derived from the radio-frequency receive signal.

* * * * *